United States Patent
Wood et al.

(10) Patent No.: US 7,961,416 B2
(45) Date of Patent: Jun. 14, 2011

(54) USING READBACK SIGNALS TO ESTIMATE RADIAL LOCATION ON A ROTATING STORAGE DEVICE

(75) Inventors: Roger William Wood, Gilroy, CA (US); Jonathan Darrel Coker, Rochester, MN (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 136 days.

(21) Appl. No.: 12/539,087

(22) Filed: Aug. 11, 2009

(65) Prior Publication Data

US 2011/0038073 A1 Feb. 17, 2011

(51) Int. Cl.
G11B 5/09 (2006.01)
G11B 21/02 (2006.01)
G11B 5/596 (2006.01)

(52) U.S. Cl. ............ 360/51; 360/77.08; 360/31; 360/75

(58) Field of Classification Search .......................... None
See application file for complete search history.

(56) References Cited

U.S. PATENT DOCUMENTS

| | | | |
|---|---|---|---|
| 4,589,037 A | 5/1986 | Jen et al. | |
| 5,193,034 A | 3/1993 | Tsuyoshi et al. | |
| 5,440,474 A | 8/1995 | Hetzler | |
| 6,084,738 A * | 7/2000 | Duffy | 360/75 |
| 7,405,893 B2 | 7/2008 | Bi et al. | |
| 2003/0197964 A1 | 10/2003 | Ashikaga et al. | |
| 2006/0082918 A1 | 4/2006 | Kosugi et al. | |

OTHER PUBLICATIONS

Eaton, R. et al., Imaging of media lubricant spacing contributions by readback signal analysis, IEEE Transactions on Magnetics, Pub Date Jan. 97, vol. 33, Issue 1, Abstract.

* cited by examiner

*Primary Examiner* — Andrew L Sniezek
(74) *Attorney, Agent, or Firm* — Mahamedi Paradice Kreisman LLP; Christopher J. Brokaw

(57) ABSTRACT

Approaches for estimating the operating radius of a head in a hard-disk drive. These approaches may be used in a constant or approximately constant density servo scheme. Statistics, which describe the proportion of high frequency values to low frequency values in a readback signal read by the read/write head of a persistent storage medium, such as a hard-disk drive (HDD), are maintained. An estimated location for the read/write head using the statistics is determined. The estimated location may be expressed as an estimated operating radius, which is an estimated distance from the center of the magnetic-recording medium to a current position of the read/write head. Based on the estimated location of the read/write head, an estimated clock frequency for a readback channel to use in reading the servo data stored on the magnetic recording medium is determined. The readback channel reads the servo data using the estimated clock frequency.

25 Claims, 4 Drawing Sheets

USING READBACK SIGNALS TO ESTIMATE RADIAL LOCATION ON A ROTATING STORAGE DEVICE

FIELD OF THE INVENTION

Embodiments of the invention generally relate to determining the radial location of a read/write head on a rotating recording medium.

BACKGROUND OF THE INVENTION

A hard-disk drive (HDD) is a non-volatile storage device, which is housed in a protective enclosure, that stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the space between a read/write head and the surface of a magnetic-recording disk must be tightly controlled. To provide a uniform distance between a read/write head and the surface of a magnetic-recording disk, an actuator relies on air pressure inside the hard drive enclosure to support the read/write heads at the proper distance away from the surface of the magnetic-recording disk while the magnetic-recording disk rotates. A read/write head therefore is said to "fly" over the surface of the magnetic-recording disk. That is, the air pulled along by a spinning magnetic-recording disk forces the head away from the surface of the magnetic-recording disk. When the magnetic-recording disk stops spinning, a read/write head must either "land" or be pulled away.

A write-head of an HDD records data onto the surface of a magnetic-recording disk in a series of concentric tracks. References markers may be recorded in each track of a magnetic-recording disk. These reference markers are referred to as servo information. To help properly position the write-head when writing data, an HDD employs a servo mechanical control loop to maintain the write head in the correct position using the servo information stored on the magnetic-recording disk. When a read-head reads the servo information (servo information being read may be referred to as a position-error signal, or PES), a relative position of the head may be determined by a servo processor to enable the position of the head, relative to the desired track, to be continually adjusted as necessary.

There are some occasions, particularly during start-up or during certain failure modes, when the servo system is not "locked," which means that the servo information is not correctly identified and distinguished from data or other information written on the disk. Under these circumstances, the servo information cannot be read and the radial position of the head on the disk cannot be determined. During this time the actuator is uncontrolled. Establishing or re-establishing "servo-lock" is one of the highest system priorities in a hard disk drive. Once the servo information is correctly recognized it can be demodulated and decoded to provide an accurate radial position down to a small fraction of a single track.

Generally, servo information is written to, and therefore read back from, the magnetic-recording disk at a constant known frequency. The use of a single fixed frequency greatly facilitates fast recognition of the servo information as distinct from data. However, because the velocity of the rotation of the magnetic-recording disk is greater at the outer edge of the disk (denoted "OD," for outer diameter) compared to the inner edge of the disk (denoted "ID," for inner diameter), the amount of physical space used to store servo information on the magnetic-record disk increases with proximity to the OD.

SUMMARY OF THE INVENTION

In a constant density servo scheme, servo information is recorded at uniform density or at an approximate uniform density, where the frequency is not constant but generally increases from ID to OD of the disk. According to one approach for implementing a constant density servo scheme, the same amount of physical space is used in each track of the magnetic recording disk to record servo information regardless of how close the track is to the ID or the OD. According to a different approach for implementing a constant density servo scheme, approximately the same amount of physical space is used in each track of the magnetic recording disk to record servo information. In such an approach, servo information is recorded onto a magnetic-recording disk in a plurality of concentric regions. In each concentric region on the magnetic-recording disk, servo information is recorded at the same frequency. However, the frequency at which servo information is recorded in a particular concentric region slightly differs with respect to an adjacent concentric region. In this way, after two or more tracks of servo information have been recorded, the frequency at which the servo information is recorded may be adjusted so that the servo information, as a whole, is recorded onto the magnetic recording medium at an approximate constant density. Advantageously, recording servo information on a magnetic recording disk using a constant density servo scheme saves physical space compared to recording servo information at constant frequency, which requires increased physical space with proximity to the OD.

By reading the servo information recorded on the magnetic recording medium, a servo processor may determine a relative position of the read/write head. However, it may be difficult to read the recorded servo information using a constant density servo scheme unless the clock rate at which the servo information should be read is known. In a constant density servo scheme, servo information is recorded at different frequencies to achieve recording at constant density or approximate constant density. The clock rate at which the servo information should be read is different for each frequency at which the servo information has been recorded upon the magnetic recording disk. Since it may not be known where the read head is relative to the magnetic-recording disk, the frequency at which the servo information passing under the read head was recorded also may not be known.

According to prior approaches for reading servo information recorded using a constant density servo scheme, the servo control loop is designed to accommodate the entire frequency range over which the servo information has been written. However, in order for the servo demodulation and detection circuitry to work, the frequency of the servo field must be known to a fairly certain degree, e.g., within a few percent of the actual value. If there is a large frequency discrepancy, then conventional servo demodulation and detection circuits will not work at all. Unfortunately, due to these limitations, the amount of physical space saved by recording servo information in a constant density servo scheme is limited because the frequency at which the servo information is recorded cannot vary beyond a small amount.

Embodiments of the invention employ an approach for reading servo information using a constant density servo scheme that overcomes the problems experienced by the prior approaches. In an embodiment, statistics about the waveforms of a readback signal are examined to estimate the location of a read/write head relative to the magnetic recording disk. The velocity at which the waveforms of a readback signal pass under the read/write head generally determines how much high frequency signal is read compared to low frequency signal. Thus, near the OD, more high frequency signal is read by the read/write head than near the ID, regardless of whether the read/write head is reading servo information, reading user data, or is straddling tracks. By examining how much high frequency signal has been read by the read/write head, embodiments of the invention are able to determine an estimate of the location of the read/write head relative to the magnetic recording disk.

In an embodiment, after determining an estimated location of the read/write head relative to the magnetic recording disk, an estimated clock frequency for use by the readback channel in reading servo information passing under the read/write head is determined. Thereafter, the readback channel may read the servo information from the magnetic-recording disk using the estimated clock frequency. Once the readback channel reads the servo information from the magnetic recording disk, the servo control loop is informed of the actual current position of the read/write head.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for using a readback signal to determine the location of a read/write head relative to a recording medium that employs a constant density servo scheme are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

There are many situations in which the actual location of a read/write head, relative to a magnetic recording medium, may not be known. For example, a servo control loop of a hard disk drive (HDD) may lose its place if the HDD is bumped. As another example, in the operation of a HDD, the read/write head comes off the ramp with an initially ill-defined speed and radial position. The read/write head needs to read servo information recorded upon the surface of the magnetic recording medium to accurately determine its location; however, the clock rate at which the servo information should be read may not be known if the magnetic recording medium employs a constant density servo scheme. As shall be discussed below, embodiments of the invention enable a readback channel to read servo information from a magnetic recording medium employing a constant density servo scheme even if the actual position of the read/write head is not known.

Physical Description of Illustrative Embodiments of the Invention

Figure 1:
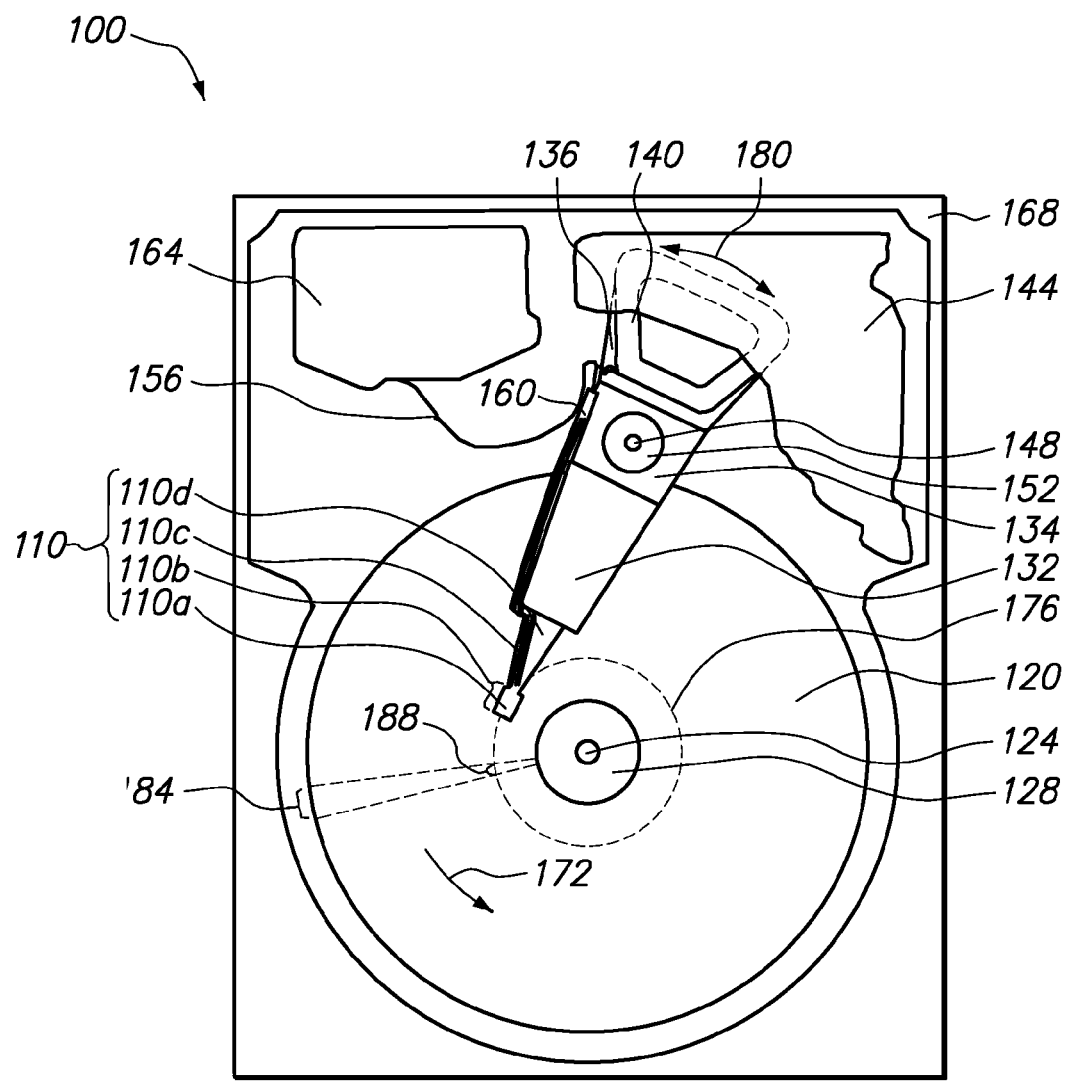
FIG. 1 is a plan view of an HDD according to an embodiment of the invention.

Embodiments of the invention may be implemented using a variety of different magnetic recording storage mediums, such as a HDD. With reference to FIG. 1, in accordance with an embodiment of the invention, a plan view of a HDD 100 is shown. FIG. 1 illustrates the functional arrangement of components of the HDD including a slider 110*b* including a magnetic-recording head 110*a*. The HDD 100 includes at least one HGA 110 including the head 110*a*, a lead suspension 110*c* attached to the head 110*a*, and a load beam 110*d* attached to the slider 110*b*, which includes the head 110*a* at a distal end of the slider 110*b*; the slider 110*b* is attached at the distal end of the load beam 110*d* to a gimbal portion of the load beam 110*d*. The HDD 100 also includes at least one magnetic-recording disk 120 rotatably mounted on a spindle 124 and a drive motor (not shown) attached to the spindle 124 for rotating the disk 120. The head 110*a* includes a write element, a so-called writer, and a read element, a so-called reader, for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the invention, electrical signals, for example, current to the voice coil 140 of the VCM, write signal to and read signal from the PMR head 110*a*, are provided by a flexible cable 156. Interconnection between the flexible cable 156 and the head 110*a* may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Embodiments of the invention also encompass HDD 100 that includes the HGA 110, the disk 120 rotatably mounted on the spindle 124, the arm 132 attached to the HGA 110 including the slider 110b including the head 110a. Therefore, embodiments of the invention incorporate within the environment of the HDD 100, without limitation, the subsequently described embodiments of the invention for using a readback signal to determine the location of a read/write head relative to a recording medium that employs a constant density servo scheme as further described in the following discussion. Similarly, embodiments of the invention incorporate within the environment of the HGA 110, without limitation, the subsequently described embodiments of the invention for using a readback signal to determine the location of a read/write head relative to a recording medium that employs a constant density servo scheme as further described in the following discussion.

Figure 2:
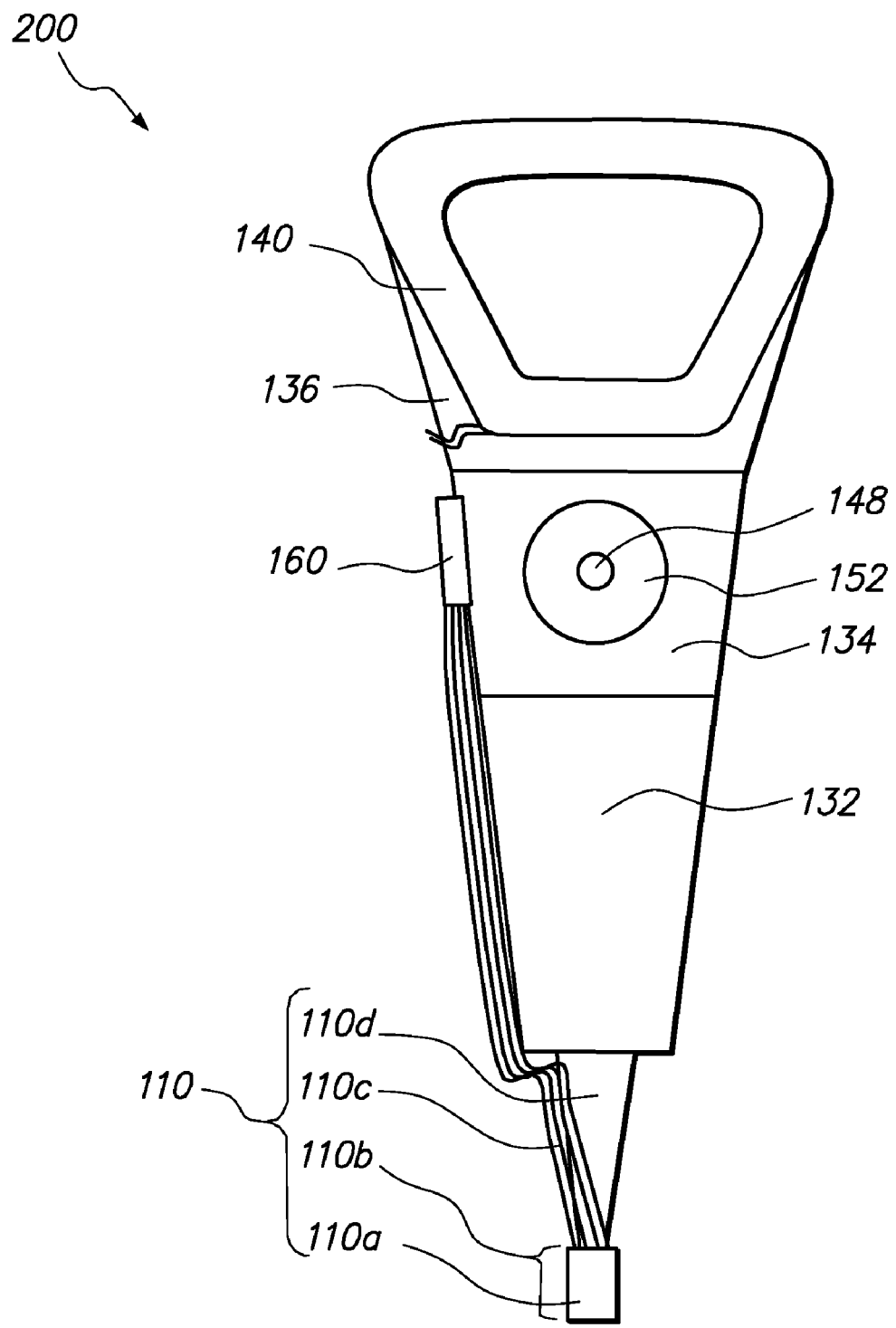
FIG. 2 is a plan view of a head-arm-assembly (HAA) according to an embodiment of the invention.

With reference now to FIG. 2, in accordance with an embodiment of the invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110b including the head 110a. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Note that embodiments of the invention are not limited to storage devices that use a rigid magnetic disk or a magnetic recording medium, as embodiments of the invention may be implemented using a flexible disk substrate or to a recording medium that includes a ferroelectric or phase change, for example.

Having described the physical description of an illustrative embodiment of the invention, discussion will now be presented describing how a readback signal may be used to determine the location of a read/write head relative to a recording medium that employs a constant density servo scheme.

Determining the Location of a Read/Write Using a Readback Signal

Figure 3:
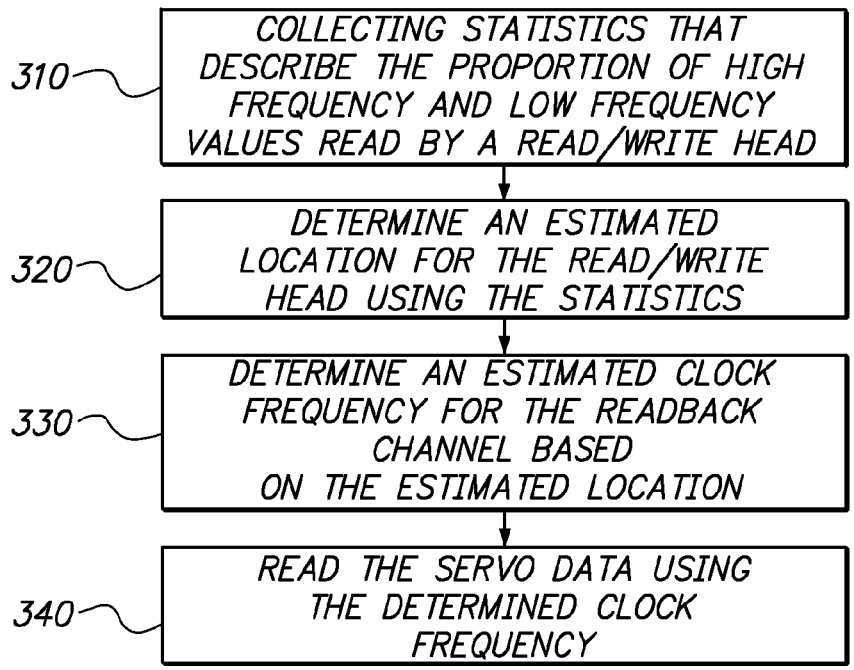
FIG. 3 is a flowchart illustrating the functional steps of reading servo information according to an embodiment of the invention.

FIG. 3 is a flowchart 300 illustrating the functional steps of reading servo information according to an embodiment of the invention. The functional steps illustrated by FIG. 3 may be used to determine the relative location of a read/write head over a magnetic recording medium that employs a constant density servo scheme. Each of the steps of FIG. 3 may be performed by electronic components of HDD 100.

Figure 4:
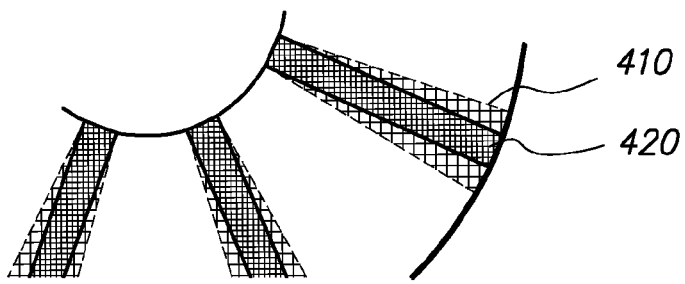
FIG. 4 is an illustration comparing the physical surface area of a magnetic recording medium required in recording data at a constant density versus constant frequency.

FIG. 4 is an illustration 400 comparing the physical surface area of a magnetic recording medium required to record servo information at a constant density versus a constant frequency. In FIG. 4, area 410 depicts the physical surface area required to record servo information at constant frequency and area 420 depicts the physical surface area required to record servo information at constant density. Note that FIG. 4 is not to scale, as the physical area depicted by area 410 and area 420 is for illustration purposes only. As shown by FIG. 4, less physical surface area is required to record servo information at constant density rather than constant frequency. Advantageously, flowchart 300 of FIG. 3 describes an approach for reading servo information stored on a magnetic recording medium that employs a constant density servo scheme.

Returning to FIG. 3, according to an embodiment, in step 310 statistics (denoted "readback statistics") are collected and maintained that describe characteristics of the readback waveform read by head 110a over a particular period of time. These readback statistics describe the proportion of high frequency values and low frequency values read by head 110a over a particular period of time. In an embodiment, the readback statistics, in essence, describe how much high frequency signal is read by head 110a compared to low frequency signal. The velocity at which the waveforms of a readback signal pass under head 110a generally determines how much high frequency signal is read compared to low frequency signal. Thus, near the OD, more high frequency signal is read by head 110a than near the ID, regardless of whether head 110a is reading servo information, reading user data, or is straddling tracks. Therefore, the readback statistics gathered in step 310 may be used to determine the velocity of the rotation of the magnetic recording disk under head 110a.

In an embodiment, the readback channel will perform or assist in the extraction of readback statistics. In step 310, data may be continuously read from the magnetic recording medium while the readback statistics are collected and maintained. For example, the read gate may remain open to allow data to be continuously read from the magnetic recording medium, regardless of whether head 110a is reading servo information, reading user data, or is straddling tracks.

In an embodiment, prior to performing step 310, head 110a may be configured to operate in accordance with a set of known configuration values. In this way, the readback statistics at a given radius may be collected and maintained while head 110a is operating in a known state to facilitate meaningful interpretation of the readback statistics, as certain configuration settings of head 110a may affect how much high frequency values or low frequency values are read by head 110a. For example, configurable characteristics of head 110a, such as the thermal fly height control (TFC), preamp, and channel front-end, should operate in accordance with a set of known values or settings when collecting and maintaining readback statistics in step 310.

In an embodiment, the readback statistics collected and maintained in step 310 may describe the following statistics:

Statistic 1: $\Sigma(y_k - y_{k-1})^2$
Statistic 2: $\Sigma y_k^2$ where y=readback voltage, k=a counter or index, and $y_k$ is the kth sample of the readback waveform. Samples are usually taken consistently at a predetermined rate. The predetermined rate might, for example, be chosen to be the maximum rate supported by the readback channel, such that the digital approximation to the analog derivative is as accurate as possible. These statistics will be used in step 320 to determine an estimated location for head 110a.

In step 320, an estimated location for head 110a using the readback statistics of step 310 is determined. One approach for determining an estimated location for head 110a in step 320 is to determine an estimated operating radius for head 110a. An estimated operating radius is an estimated distance from the center of the magnetic recording medium or disk to a current position of read/write head 110a.

The estimated operating radius may be determined by initially determining the velocity at which the magnetic recording medium is passing under head 110a. This velocity may be determined by examining the readback statistics collected and maintained in step 310. The velocity at which the waveforms of a readback signal pass under the read/write head generally determines how much high frequency signal is read compared to how much low frequency signal is read. Thus, near the OD, more high frequency signal is read by head 110a than near the ID, regardless of whether head 110a is reading servo information, reading user data, or is straddling tracks. By examining the amount of high frequency signal read by head 110a compared to the amount of low frequency signal read by head 110a, the velocity of the magnetic recording medium passing under head 110a may be determined.

After determining the velocity of the magnetic recording medium passing under head 110a, the estimated location of head 110a may be determined. As the magnetic recording medium rotates at a known rate and has a radius of a known size, the velocity at which the magnetic recording medium is rotating at each point from the ID to the OD is known. Thus, by determining the velocity of the rotation of the magnetic recording medium passing under head 110a, the current location of head 110a may be estimated.

In an embodiment, the estimated location for head 110a determined in step 320 may be determined by either the read/write channel or the hard disk controller (HDC) interpreting the readback statistics of step 310. Previously, the read/write channel and the hard disk controller may have been implemented as separate devices; however, recently, the read/write channel and the HDC may be implemented by a single device or component, such as a single chip. Other embodiments of the invention may employ other computerized components or devices to perform step 320.

An embodiment of the invention operates under the assumption that the autocorrelation function, $r_{0yy}(x)$, and equivalently its Fourier transform, the power spectral density, $S_y(k)$, are fixed and independent of velocity and radius. In these expressions, x is the distance down-track, and k is the spatial frequency (e.g. radians/meter). Distances and spatial frequency translate into time (t) and frequency ($\omega$) via the disk velocity (v), which is a 1:1 function of the radial position on the disk.

Thus:

$$x = t*v$$

$k = \omega/v$ ($\omega$ might be in radians per second, for example)

Therefore:

$$r_{0yy}(x) = r_{0yy}(t*v)$$

$$S_{0y}(\omega) = (1/v)*S_{0y}(\omega/v)$$

The change in response to a small change, $\delta v$, in velocity is $$\delta r_{yy}(t) = \delta v * d\, r_{0yy}(t*v)/dv$$
$$= \delta v * t * d\, r_{0yy}(t*v)/d(t*v)$$

$$\delta S_y(\omega) = \delta v * d[(1/v)*S_{0y}(\omega/v)]/dv$$
$$= \delta v * [(-1/v^2)*S_{0y}(\omega/v) + (1/v)*dS_{0y}(\omega/v)dv]$$
$$= \delta v * [(-1/v^2)*S_{0y}(\omega/v) + (1/v)*(-\omega/v^2)*dS_{0y}(\omega/v)/d(\omega/v)]$$
$$= -(\delta/v^2)*[S_0(\omega/v) + k*ds_0(\omega/v)/d(\omega/v)]$$

Assuming the measurement is perturbed by white noise, then an optimal estimate of v may be obtained from either of the following integrals:

$$\delta v = C_1 * \int \{\delta r_{yy}(t) * [t * dr_{0yy}(t*v)/d(t*v)]\} dt$$

or $$\delta v = C_2 * \int \{\delta S_y(\omega) * [S_{0y}(\omega/v) + k*dS_{0y}(\omega/v)/d(\omega/v)]\} d\omega$$

where $\delta r_{yy}(t)$ or $\delta S_y(\omega)$ may be the difference between the measured $r_{yy}(t)$ or $S_y(\omega)$ and some reference measurement, $r_{0yy}(t)$ or $S_{0y}(\omega)$ at, for example, the middle diameter (MD) of the disk and its corresponding known velocity. The functions $[t*dr_{0yy}(t*v)/d(t*v)]$ or $[S_{0y}(\omega/v) + k*dS_{0y}(\omega/v)/d(\omega/v)]$ may be derived from the same reference measurement or may be derived as an analytic simplification. The constant $C_1$ or $C_2$ in each case may need to be pre-calibrated and may have some dependence on the particular head/disk combination. Note that the autocorrelation function is often taken as a discrete function of time, $r_{yy}(k\tau)$, where $\tau$ is the bit interval and k is a counter or index.

Figure 5:
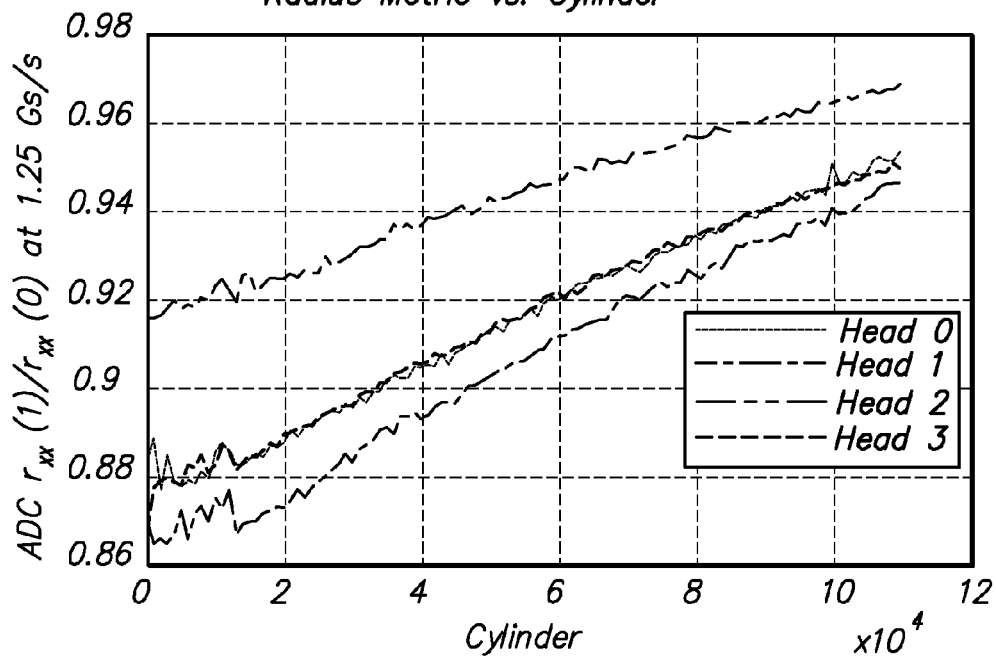
FIG. 5 is a graph depicting the metric $R_{xx}(1)/R_{xx}(0)$ measured on a mobile drive having four heads according to an embodiment of the invention.

FIG. 5 is a graph depicting the metric $R_{XX}(1)/R_{XX}(0)$ measured on a mobile drive having four heads according to an embodiment of the invention. In FIG. 5, the metric $r_{yy}(\tau)/r_{yy}(0) = 1 - [\Sigma\{y_k^2\} - \Sigma\{y_k * y_{k-1}\}]/\Sigma\{y_k^2\} = 1\frac{1}{2}\Sigma(y_k - y_{k-1})^2/\Sigma k^2)$. Each measurement point is derived from 200 microseconds worth of asynchronous samples at 1.25 Gsamples/s, which includes both servo and data fields. There are significant differences from head to head that may be calibrated out. However, given the calibration actor, an estimate of the estimated operating radius for each head may be determined within a few percent.

In another embodiment, a different calculation may be used to determine the estimated location of head 110a in step

320. To illustrate, $\Sigma\{(y_k-y_{k-1})^2\}/\Sigma\{y_k^2\}=[2\Sigma\{y_k^2\}-2\Sigma\{y_k*y_{k-1}\}]/\Sigma\{y_k^2\}=2[1-r_{yy}(1)/r_{yy}(0)]$. This corresponds to:

$$\delta v = C*f\{\delta r_{yy}(t)*[t*dr_{0yy}(t*v)/d(t*v)]\}$$

where $\delta r_{yy}(t)$ is measured only at the two values, $t=0$ and $t=\tau$, and the R(0) gets absorbed into a constant C. In an embodiment, head 110a may be calibrated to identify constant C in the above expressions. In an embodiment, each individual head of head 110a may need to be calibrated to obtain a constant C for that head.

Expressed differently, the estimated operating radius r may equal $C.f(\Sigma y_k-y_k-1)^2/\Sigma y_k^2)$, where C is a constant determined from typical drive operation, k is a counter or index, and f is either a square root function or a look up table derived from drive operation. According to an approach, the function f may incorporate the constant C, in which case the estimated operating radius r may be determined by computing $f(\Sigma y_k-y_{k-1})^2/\Sigma y_k^2)$, where f is a square root function or a look up table (that incorporates the constant C), and k is a counter or index.

In step 330, an estimated clock frequency for the readback channel to use, based on the estimated location of head 110a, is determined. In an embodiment, step 330 may be performed by determining the estimated clock frequency for the readback channel to use based on the estimated operating radius of head 110a determined in step 320.

To illustrate, if the estimated operating radius of head 110a is known, then the relative position of head 110a between the ID and the OD of the magnetic recording disk is known. Therefore, since the relative position of head 110a between the ID and the OD of the magnetic recording disk is known, the frequency at which data recorded at the estimated position of head 110a may be known or determinable. Once the frequency at which data recorded at the estimated position of head 110a may be known or determined, the estimated clock frequency for the readback channel to use in reading data at the current estimated position of head 110a may be calculated.

In an embodiment, the estimated clock frequency for the readback channel determined in step 330 may be determined by either the read/write channel or by the hard disk controller (HDC). Other embodiments of the invention may employ other computerized components or devices to perform step 330.

In step 340, the servo information is read by head 110a and the readback channel using the estimated clock frequency determined in step 330. Thus, by performing step 340, head 110a is able to achieve "servo lock," which mean being able to determine the current position of head 110a by reading the servo information from the magnetic recording medium. After obtaining servo lock, the servo control loop will rely upon the servo information read from the magnetic recording medium, rather than the performance of step 320, to determine the current location of head 110a. Once the current position of head 110a is known after obtaining servo lock, the servo control loop may operate normally by reading servo information recorded on the magnetic recording medium to identify, to the servo control loop, the present position of head 110a.

Checking the Accuracy of the Estimated Operating Radius

In an embodiment, the accuracy of the estimated location of head 110a (such as the estimated operating radius) determined in step 320 or the estimated clock frequency determined in step 330 may be checked using the actual position of head 110a determined by reading servo information in step 340. In such an embodiment, step 320 or step 330 may be performed simultaneously or contemporaneously with step 340.

Note that checking the accuracy of the estimated location of head 110a determined in step 230 or the estimated clock frequency determined in step 330 is optional, as embodiments of the invention may not do so. Indeed, in certain embodiments of the invention, after obtaining servo lock, steps 310, 320, and 330 are no longer performed, as the servo control loop has obtained servo lock.

In an embodiment, head 110a may be periodically recalibrated after a period of operation to determine the accuracy of constant C being employed by embodiments of the invention or to update the constant C being employed by embodiments of the invention.

Use with User Data Recorded at Multiple Frequencies

Embodiments of the invention may be used to read servo information recorded on a zoned recording medium. A zoned recording medium is a magnetic recording medium that records data in a plurality of different zones, where data in each zone is recorded at a different frequency. It is observed that when the frequency at which data is recorded onto a magnetic recording medium is changed in distinct steps, the effect of this change in frequency between zones is relatively minor compared to the general trend. This is illustrated by FIG. 6, which is a graph of the estimated operating radius determined in step 320 versus the actual operating radius determined in step 340 according to an embodiment of the invention that employs a zoned recording medium.

Figure 6:
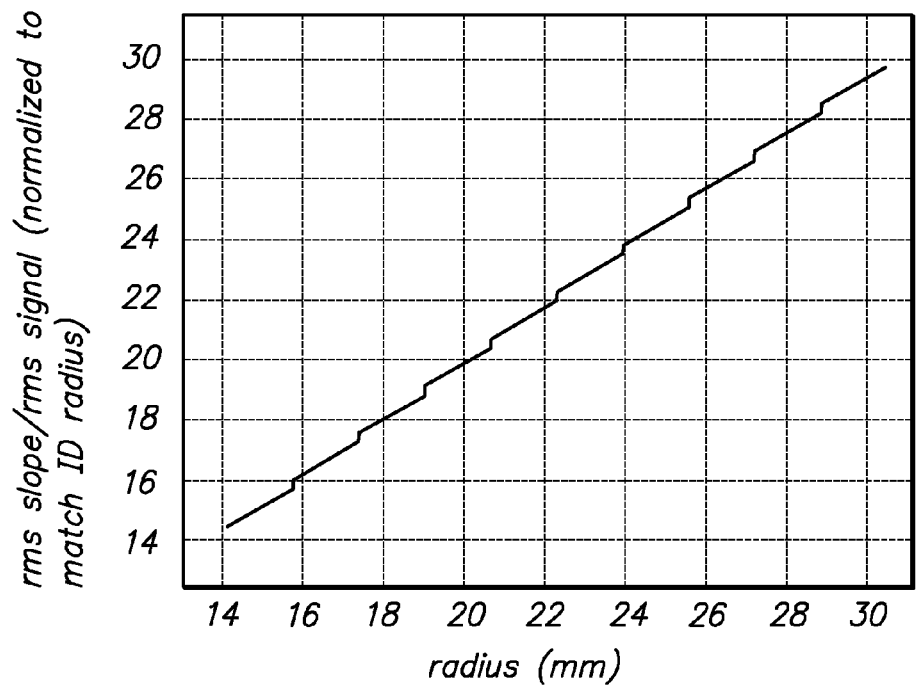
FIG. 6 is a graph of the estimated operating radius versus the actual operating radius according to an embodiment of the invention the employs a zoned recording medium.

As shown by FIG. 6, the estimated operating radius determined in step 320 (corresponding to the Y-axis) is very similar to the actual radius determined in step 340 (corresponding to the X-axis). While the difference between the estimated operating radius determined in step 320 and the actual radius determined in step 340 increases with distance, the difference between the two is still within the margin of error for embodiments of the invention to read servo information recorded onto a zoned medium. FIG. 6 depicts an embodiment of the invention that reads servo information from a zoned medium with 10 distinct zones.

Use with Servo Information Recorded at Multiple Frequencies

Embodiments of the invention may be used with an approach for implementing a constant density servo scheme which records servo information onto a magnetic-recording disk in a plurality of concentric regions. For example, servo information may be recorded onto a magnetic-recording disk in 20-30 concentric regions. In each concentric region, servo information is recorded at the same frequency. However, the frequency at which servo information is recorded in a particular concentric region slightly differs with respect to an adjacent concentric region. In this way, after two or more tracks of servo information have been recorded for one concentric zone, the frequency at which the servo information is recorded for an adjacent concentric zone may be adjusted so that the servo information, as a whole, is recorded onto the magnetic recording medium at an approximate constant density. For a given pair of adjacent concentric zones, the particular concentric zone that is closer to the OD will contain servo information recorded at a slighter higher frequency than the adjacent concentric zone that is closer to the ID, as the velocity of the rotation of the magnetic-recording disk increases with proximity to the OD.

This approach is useful in certain contexts where is it difficult to adjust the frequency at which servo information is written each time a track of servo information is written. By recording servo information on a magnetic recording disk using a plurality of concentric zones, recording servo information written at an approximate constant density may be achieved and physical space will still be saved compared to recording servo information at constant frequency, which requires increased physical space with proximity to the OD.

Embodiments of the invention may be used with an approach that records servo information onto a magnetic-recording disk in a plurality of concentric zones as discussed above, as the change in frequency at which servo information is recorded between adjacent concentric zones is small compared to the general trend. Thus, embodiments of the invention may be employed to obtain servo lock on magnetic-recording mediums where servo information has been recorded using a plurality of concentric zones as discussed above.

Use with Bit Patterned Media

Embodiments may be used with a wide variety of magnetic recording media which use a constant density servo scheme. For example, embodiments of the invention may be used in conjunction with conventional magnetic recording media, discrete track media, or bit patterned media (BPM). Bit patterned media is a magnetic storage technology used to record data in a uniform array of magnetic cells, storing one bit per cell, as opposed to conventional hard-drive technology, where each bit is stored across a few hundred magnetic grains. In BPM, each bit is carried by the polarity of a magnetic island. There may be roughly $10^{13}$ such islands on the magnetic recording disk arrayed in a simple, regular pattern.

The density of the magnetic islands is expected to be roughly constant in the down-track direction. For this reason, the readback response expressed in the spatial-domain will be relatively independent of the radius. However, expressed in the time-domain, the response will depend strongly on the radius. This dependency may be even more precise than for a conventional recording medium because of the individual islands are deliberately arrayed in a very exact pattern with a known density. Consequently, embodiments of the invention may be successfully used with magnetic recording mediums employing BPM technology.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive comprising:
an enclosure;
a magnetic read/write head;
a magnetic-recording disk rotatably mounted on a spindle;
a drive motor mounted in said enclosure, said drive motor having a motor shaft attached to said spindle for rotating said magnetic-recording disk;
a voice-coil motor configured to move said magnetic read/write head to access portions of said magnetic-recording disk; and
one or more electronic components for reading servo data stored on the magnetic-recording disk, wherein the one or more electronic components are configured to perform:
collecting statistics that describe the proportion of high frequency values to low frequency values in a readback signal, wherein the readback signal is read by the magnetic read/write head from a portion of the magnetic-recording disk,
determining an estimated location of the magnetic read/write head using the statistics,
determining, based on the estimated location of the magnetic read/write head, an estimated clock frequency for the readback channel to use in reading the servo data stored on the magnetic-recording disk, and
the readback channel reading the servo data, from the magnetic-recording disk, using the estimated clock frequency.

2. The hard-disk drive of claim 1, wherein determining the estimated location is performed simultaneously with the readback channel reading the servo data, and wherein the one or more electronic components are further configured to perform:
determining the accuracy of the estimated location using the servo data read from the magnetic-recording disk by the readback channel.

3. The hard-disk drive of claim 1, wherein collecting statistics comprises configuring the magnetic read/write head to operate in accordance with a set of known configuration values.

4. The hard-disk drive of claim 1, wherein collecting statistics comprises opening a read gate to continuously read data from the magnetic-recording disk while collecting the statistics.

5. The hard-disk drive of claim 1, wherein collecting statistics comprises:
collecting statistics that describe $\Sigma(y_k - y_{k-1})^2$ and $\Sigma y_k^2$, wherein y corresponds to regular voltage samples and k is a counter.

6. The hard-disk drive of claim 5, wherein the one or more electronic components are configured to perform:
prior to collecting the statistics, calibrating the magnetic read/write head to identify a scaling constant C that relates the statistics to the radius of the magnetic-recording disk.

7. The hard-disk drive of claim 1, wherein determining the estimated location further comprises:
determining the estimated location by computing $f(\Sigma(y_k - y_{k-1})^2 / (\Sigma y_k^2))$, wherein k is a counter and f corresponds to a square root function multiplied by a constant or function or a lookup table.

8. The hard-disk drive of claim 1, wherein determining the estimated location further comprises:
determining the estimated location by computing $\delta v = C * \int \{\delta r_{yy}(t) * [t * \delta r_{0yy}(t*v)/\delta(t*v)]\}$, wherein $\delta r_{yy}(t)$ is measured at two values, t=0 and t=τ, wherein τ is the bit interval, wherein C is a constant of calibration, wherein v is the velocity of the magnetic-recording disk, wherein t is time, and wherein $r_{yy}$ is an autocorrelation function of signal y.

9. The hard-disk drive of claim 1, wherein the magnetic-recording disk employs a patterned media scheme.

10. The hard-disk drive of claim 1, wherein the magnetic-recording disk stores user data in a plurality of zones, and wherein each zone of the plurality of zones is used to store the user data at a different frequency than any other zone in the plurality of zones.

11. The hard-disk drive of claim 1, wherein the magnetic-recording disk has servo information recorded thereon in a plurality of zones, and wherein each zone of the plurality of zones comprises servo information recorded at a different frequency than any other zone in the plurality of zones.

12. The hard-disk drive of claim 1, wherein the portion read by the readback channel overlaps two different tracks.

13. A machine-implemented method for reading servo data stored on a magnetic-recording disk, comprising:
   collecting statistics that describe the proportion of high frequency values to low frequency values in a readback signal, wherein the readback signal is read by a magnetic-reading head from a portion of the magnetic-recording disk employing a constant density servo scheme;
   determining an estimated location for the magnetic-reading head using the statistics;
   determining, based on the estimated location, an estimated clock frequency for a readback channel to use in reading the servo data stored on the magnetic-recording disk; and
   the readback channel reading the servo data, from the magnetic-recording disk, using the estimated clock frequency.

14. The machine-implemented method of claim 13, wherein determining the estimated location is performed simultaneously with the readback channel reading the servo data, and wherein the method further comprises:
   determining the accuracy of the estimated location using the servo data read from the magnetic-recording disk by the readback channel.

15. The machine-implemented method of claim 13, wherein collecting statistics comprises configuring the magnetic reading head to operate in accordance with a set of known configuration values.

16. The machine-implemented method of claim 13, wherein collecting statistics comprises opening a read gate to continuously read data from the magnetic-recording disk while collecting the statistics.

17. The machine-implemented method of claim 13, wherein collecting statistics comprises:
   collecting statistics that describe $\Sigma(y_k-y_{k-1})^2$ and $\Sigma y_k^2$, wherein y corresponds to voltage and k is a counter.

18. The machine-implemented method of claim 17, further comprising:
   prior to maintaining the statistics, calibrating the read/write head to identify a constant C that relates the statistics to the radius of the magnetic-recording disk.

19. The machine-implemented method of claim 13, wherein determining the estimated location further comprises:
   determining the estimated operating radius by computing $f(\Sigma(v_k-v_{k-1})^2/(\Sigma v_k^2)$, wherein k is a counter and f corresponds to a square root function multiplied by a constant or a function or lookup table.

20. The machine-implemented method of claim 13, wherein determining the estimated location further comprises:
   determining the estimated location by computing $\delta v = C * \int\{\delta r_{yy}(t) * [t * \delta r_{0yy}(t*v)/\delta(t*v)]\}$, wherein $\delta r_{yy}(t)$ is measured at two values, t=0 and t=τ, wherein τ is the bit interval, wherein C is a constant of calibration, wherein v is the velocity of the magnetic-recording disk, wherein t is time, and wherein $r_{yy}$ is an autocorrelation function.

21. The machine-implemented method of claim 13, wherein the magnetic-recording disk employs a patterned media scheme.

22. The machine-implemented method of claim 13, wherein the magnetic-recording disk stores user data in a plurality of zones, and wherein each zone of the plurality of zones is used to store the user data at a different frequency than any other zone in the plurality of zones.

23. The machine-implemented method of claim 13, wherein the magnetic-recording disk has servo information recorded thereon in a plurality of zones, and wherein each zone of the plurality of zones comprises servo information recorded at a different frequency than any other zone in the plurality of zones.

24. The machine-implemented method of claim 13, wherein the portion read by the readback channel overlaps two different tracks.

25. A hard-disk drive comprising:
   a head;
   a recording disk rotatably mounted on a spindle;
   a drive motor mounted in said enclosure, said drive motor having a motor shaft attached to said spindle for rotating said recording disk;
   a voice-coil motor configured to move said head to access portions of said recording disk; and
   one or more electronic components for reading servo data stored on the recording disk, wherein the one or more electronic components are configured to perform:
      collecting statistics that describe the proportion of high frequency values to low frequency values in a readback signal, wherein the readback signal is read by the head from a portion of the recording disk, wherein the statistics describe $\Sigma(y_k-y_{k-1})^2$ and $\Sigma y_k^2$, and wherein y corresponds to regular voltage samples and k is a counter,
      determining an estimated location of the head using the statistics,
      determining, based on the estimated location of the head, an estimated clock frequency for the readback channel to use in reading the servo data stored on the recording disk, and
      the readback channel reading the servo data, from the recording disk, using the estimated clock frequency.

* * * * *